(12) United States Patent
Martinsson et al.

(10) Patent No.: US 9,400,814 B2
(45) Date of Patent: *Jul. 26, 2016

(54) HIERARCHY NODES DERIVED BASED ON PARENT/CHILD FOREIGN KEY AND/OR RANGE VALUES ON PARENT NODE

(75) Inventors: Lars E. Martinsson, Redwood City, CA (US); Mikhail Dumay, Walnut Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/844,743

(22) Filed: Jul. 27, 2010

(65) Prior Publication Data
US 2011/0022639 A1 Jan. 27, 2011

Related U.S. Application Data

(63) Continuation-in-part of application No. 11/939,505, filed on Nov. 13, 2007, now Pat. No. 7,788,305.

(51) Int. Cl.
*G06F 17/30* (2006.01)
(52) U.S. Cl.
CPC ................................ *G06F 17/30321* (2013.01)
(58) Field of Classification Search
CPC ... G06F 3/0685; G06F 8/454; G06F 11/3048; G06F 12/08; G06F 12/0811; G06F 12/0897; G06F 12/1491; G06F 15/17362; G06F 17/2241; G06F 17/30073; G06F 17/30221; G06F 17/30589; G06F 17/30643; G06F 17/30321
USPC ................. 707/601, 706, 713, 726, 759, 767, 707/777–782, 785–788, 797–811
See application file for complete search history.

(56) References Cited

U.S. PATENT DOCUMENTS

| | | | |
|---|---|---|---|
| 5,838,965 A * | 11/1998 | Kavanagh et al. | |
| 5,873,075 A * | 2/1999 | Cochrane et al. | |
| 5,983,277 A | 11/1999 | Heile et al. | |
| 6,138,123 A * | 10/2000 | Rathbun | |
| 6,298,319 B1 | 10/2001 | Heile et al. | |
| 6,311,179 B1 * | 10/2001 | Agarwal et al. | |
| 6,343,291 B1 * | 1/2002 | Goldman | 707/802 |
| 6,642,946 B1 * | 11/2003 | Janes | G06Q 10/087 715/769 |
| 6,944,627 B2 * | 9/2005 | Zhang | G06F 17/30961 |
| 7,668,850 B1 * | 2/2010 | Bierner | G06F 17/30011 707/694 |
| 7,702,636 B1 * | 4/2010 | Sholtis et al. | 707/999.1 |
| 2003/0105771 A1 * | 6/2003 | Tiefenbrun | G06F 17/30126 |
| 2003/0212698 A1 * | 11/2003 | Mani et al. | 707/102 |
| 2006/0190355 A1 * | 8/2006 | Jammes et al. | 705/27 |
| 2007/0112842 A1 * | 5/2007 | Gould et al. | 707/102 |

(Continued)

*Primary Examiner* — Shew-Fen Lin
(74) *Attorney, Agent, or Firm* — Hickman Palermo Becker Bingham LLP

(57) ABSTRACT

Nodes of a tree are dynamically generated. A user may specify that a node should have a separate child node for each unique value that occurs in a particular column of a relational table. A user may specify that a node should have a separate child node for each range of values in a user-specified set of ranges. Child nodes of a particular node may be dynamically determined and displayed by querying one or more relational tables for records that satisfy all of the criteria that are implied by that particular node and that particular node's parents. As a result of the foregoing techniques, users are not forced to create a tree node-by-node; instead, users can specify criteria based on which a whole level of nodes should be created, and a whole level of nodes may be added to a tree based on those criteria.

16 Claims, 3 Drawing Sheets

(56) References Cited

U.S. PATENT DOCUMENTS

| | | | | |
|---|---|---|---|---|
| 2007/0185900 A1* | 8/2007 | Gadamsetty | ...... | G06F 17/30958 |
| 2007/0282823 A1* | 12/2007 | Keith, Jr. | .......................... | 707/4 |
| 2009/0012932 A1* | 1/2009 | Romem et al. | .................... | 707/2 |
| 2010/0036843 A1 | 2/2010 | MacNaughton et al. | | |

\* cited by examiner

HIERARCHY NODES DERIVED BASED ON PARENT/CHILD FOREIGN KEY AND/OR RANGE VALUES ON PARENT NODE

The present application claims priority under 35 U.S.C. §120 as a continuation-in-part of U.S. patent application Ser. No. 11/939,505; which was filed on Nov. 13, 2007 now U.S. Pat. No. 7,788,305; which is titled "HIERARCHY NODES DERIVED BASED ON PARENT/CHILD FOREIGN KEY AND/OR RANGE VALUES ON PARENT NODE;" and the contents of which are incorporated by reference herein.

FIELD OF THE INVENTION

Embodiments of the invention described herein relate to databases, and, more specifically, to techniques for storing hierarchical data within a relational database system.

BACKGROUND

Large projects, inventories, and organizations typically necessitate a correspondingly large information infrastructure. This information infrastructure often includes large amounts of data that can be represented logically in a hierarchical fashion. For example, a book store may electronically organize its inventory hierarchically (e.g., first by genre, then by author, then by title). Hierarchical data structures are also used elsewhere to organize data (e.g., project scheduling, organizational charts, etc.).

Organizing data in a hierarchical fashion is commonly handled by storing the data in tree data structures. Tree management software allows users to store hierarchically organized data as logical trees in relational databases. For example, using tree management software, a user can define an organizational chart for his business that shows, for each department of the business, which employees work in that department. To do so, the user specifies parent-child relationships between database entries. A parent-child relationship defines the connection between an upper-level node in the tree with the node's direct descendants. After parent-child relationships have been defined, nodes can be inserted into the tree.

A book store inventory example might be considered for illustrative purposes. A book store inventory can be stored in a tree-like structure. To store such a structure, a user uses tree management software to define the tree data structure, including parent-child relationships between nodes. The tree data structure for the book store inventory begins with a root node that represents the overall book store inventory. Underneath the root node, the user can use the tree management software to subdivide the inventory into genres by creating child nodes representing specific genres of books (e.g., "fiction," "history," "fantasy," etc.). The user can then categorize the inventory according to author name by creating, under each of the genre nodes, child nodes that represent authors. At the lowest level of the tree, the user defines what a leaf node looks like (e.g., a node that lists a book title, price, and availability) and then adds leaf nodes to the tree based on what is actually in the book store's physical inventory.

Large organizations often use more than one separate hierarchical structure to represent and manage different sets of related information. For example, cost information, scheduling information, and work flow data may be related to each other in the real-world, yet each set of information is often stored in a separate hierarchical structure. For instance, a business accounting department may need access to scheduling, resources, and labor costs, to insure that sufficient funds are available to meet payroll. Unfortunately, for a variety of reasons (e.g., confidentiality and data management), businesses often use disparate hierarchical structures to represent disparate data.

These approaches suffer from some problems. Typically, for each node in a hierarchy, the parent-child relationship information is physically stored in a location separate from the underlying data sources. This can become expensive in terms of the computer resources used. In other words, storing all children for a parent in a separate hierarchy becomes expensive storage-space wise. It is also often labor-intensive to maintain the same information in separate locations.

Current hierarchical data representations and approaches for managing such data representations suffer from a number of disadvantages that become apparent as the size and complexity of those representations increase. For example, scheduling software might be used to manage project deadlines. When a single job or operation within the hierarchy is modified, delayed, or canceled, the estimated start and completion dates of all subsequent operations might need to be re-computed serially before the final completion date of the project can be made available. Similarly, should the cost of any individual sub-assembly of a larger manufactured item change, the cost of an entire item that includes that sub-assembly might need to be re-calculated by traversing the entire hierarchical structure and re-computing all costs in the structure to account for the changed cost of the sub-assembly. Since hierarchical structures may include thousands of nodes, this approach can be both time-consuming and a less-than-optimal use of computing resources.

These problems become further compounded when data is drawn from multiple sources. In the end, the same set of data ends up being stored in multiple locations. Storing such data in multiple locations adds search complexity and wastes computing resources.

Data management approaches such as those discussed above are very cumbersome. These approaches often require the user to enter each leaf node manually into the tree. Often, employee information is stored in multiple databases; for example, employee information may be stored in a human resources database and also in an organizational flowchart database. An employee might share responsibilities between two separate departments and, as a result, might need to be added to multiple locations in the same tree. Adding the employee's information to each separate database or under each separate department becomes redundant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, at least some of the nodes of a tree are dynamically generated based on (a) foreign key relationships between different data sources and/or (b) user-specified ranges. For example, a user might specify that a particular node in a tree (or each node in a particular level of a tree) should have a separate child node for each unique value that occurs in a particular column (e.g., a foreign key column) of a specified relational table. For another example, a user might specify that a particular node in a tree (or each node in a particular level of a tree) should have a separate child node for each range of values (either numeric or non-numeric) in a user-specified set of ranges. Child nodes of a particular node may be dynamically determined by querying one or more relational tables for records that satisfy all of the criteria that are implied by that particular node and that particular node's parents. A tree structure that is dynamically generated in this manner may be graphically displayed to a user. As a result of the foregoing techniques, users are not forced to create a tree node-by-node; instead, users can specify criteria based on which a whole level of nodes should be created, and a whole level of nodes may be added to a tree based on those criteria.

Dynamically Deriving Nodes of a Tree

According to one embodiment of the invention, a user defines a tree structure by specifying, for each of two or more levels of the tree, a separate data source for that level. Different levels may be associated with different data sources. For example, each data source may be a separate relational table in a relational database. Each data source contains some data that relates records in that data source to records in another data source. For example, a first relational table might contain records for shoes. Each record in the first relational table might contain a field that specifies a shoe model. In a second relational table, each record might also contain a field that specifies a shoe model. The first relational table's records that have the same shoe model as the second relational table's records are related. Such a relationship between two relational tables may be designated in a relational database system using foreign keys, for example.

Figure 3:
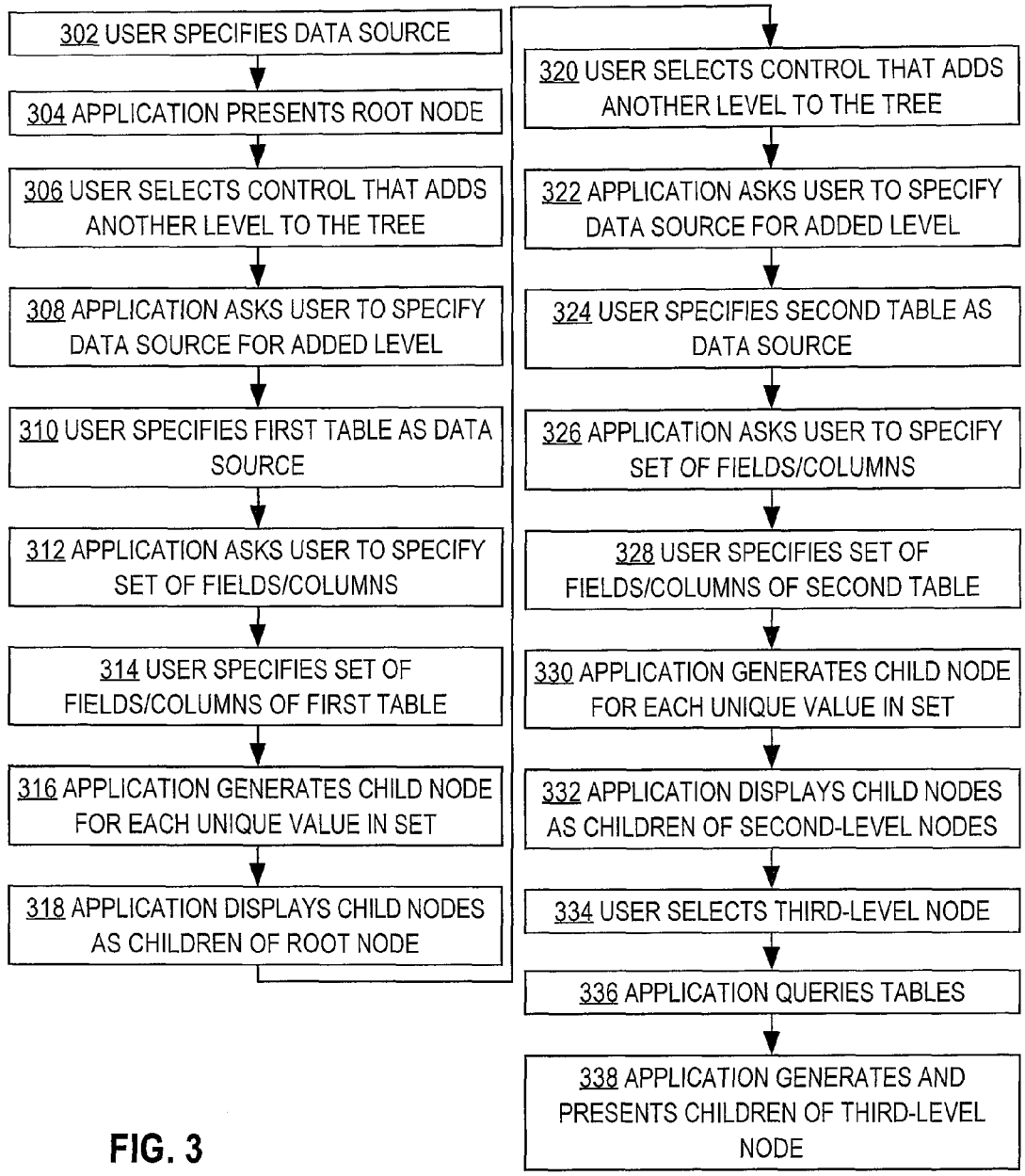
FIG. 3 is a flow diagram that illustrates a technique according to an embodiment of the invention.

FIG. 3 is a flow diagram that illustrates an example of a technique for performing an embodiment of the invention. In one embodiment of the invention, a user specifies a data source for a tree level using an application-presented graphical user interface that exposes multiple controls from which the user can select (block 302). For example, first, the user may select a control that creates a new tree. In response to the user's selection of the control, an application presents a new root node of a new tree in the graphical user interface (block 304). The root node is at the first level of the tree.

Next, the user may select a control that adds another level to the tree (block 306). In response to the user's selection of the control, the application asks the user to specify a data source for that level (block 308). The user might specify that the data source for that level is a first relational database table (block 310). The application asks the user to specify a set of one or more fields that should be used to classify the nodes on that level (block 312). The user might specify that a first field (e.g., a first column) in each record of the first relational table should be used to classify the nodes on that level (block 314). In response, the application dynamically generates a separate child node of the root node for each unique value (or unique set of values) that occurs in the specified field (or specified set of fields) of the first relational table (block 316). The application displays the newly created child nodes as children of the root node in the graphical user interface (block 318). The application labels each such child node with the unique value to which that child node corresponds. The newly created child nodes are at the second level of the tree, and are children of the previously created root node.

For example, in the first relational table, one of the columns might specify a shoe model. The user might specify that the shoe model field is the field based on which nodes in the second level should be classified. Several of the records in the first relational table might have a value of "A" in the shoe model field. Several of the records in the first relational table might have a value of "B" in the shoe model field. Several of the records in the first relational table might have a value of "C" in the shoe model field. Assuming that the values "A," "B," and "C" are the only values that occur in the shoe model field in the first relational table, the application generates three child nodes at level two of the tree: one node labeled "A," one node labeled "B," and one node labeled "C."

Next, the user may select, again, the control that adds another level to the tree (block 320). In response to the user's selection of the control, the application asks the user to specify a data source for that level (block 322). The user might specify that the data source for that level is a second relational database table that is different from the first relational table (block 324). The application asks the user to specify a set of one or more fields that should be used to classify the nodes on that level (block 326). The user might specify that a first field (e.g., a first column) in each record of the second relational table should be used to classify the nodes on that level (block 328). In response, for each second-level node, the application dynamically generates a separate child node of that second-level node for each unique value (or unique set of values) that occurs in the specified field (or specified set of fields) of the second relational table (block 330). The application displays the newly created child nodes as children of the second-level nodes in the graphical user interface (block 332). The application labels each such child node with the unique value to which that child node corresponds. The newly created child nodes are at the third level of the tree, and are children of the previously created second-level nodes.

For example, in the second relational table, one of the columns might specify a shoe size. The user might specify that the shoe size field is the field based on which nodes in the third level should be classified. Several of the records in the second relational table might have a value of "10" in the shoe size field. Several of the records in the second relational table might have a value of "12" in the shoe size field. Several of the records in the second relational table might have a value of "14" in the shoe size field. Assuming that the values "10," "12," and "14" are the only values that occur in the shoe size field in the second relational table, the application generates, at level three of the tree, three child nodes of each second-level node: one node labeled "10," one node labeled "12," and one node labeled "14."

With the tree so created, the user may select one of the third-level nodes to cause the application to dynamically generate and present child nodes of that third-level node (block 334). For example, to select a particular third-level node, the user might double-click on the particular third-level node. In response, the application may query the second relational table (the data source specified for the third level) for all records that (a) have the particular third-level node's shoe size value in the shoe size field (the classification field specified for the third level) and also (b) have, in a shoe model field (the classification field specified for the second level), a shoe model value that matches the shoe model value of the parent of the particular third-level node (block 336). For example, assuming that the particular third-level node's shoe size value is "10," and assuming that the parent of the particular third-level node's shoe model value is "A," then, for each record in the second relational table that has both (a) a value of "10" in that record's shoe size field and (b) a value of "A" in that record's shoe model field, the application generates and presents a separate fourth-level child node of the particular third-level node based on that record (block 338). Each such node may be labeled with all of the data from the corresponding record (e.g., shoe color, unit number, etc.) in the corresponding data source. Each such fourth-level node might represent a separate physical pairs of shoes in a shoe store's inventory, for example.

In one embodiment of the invention, these nodes are generated dynamically based on whatever data currently exists in the specified data sources. If the data in the specified data sources changes, then the displayed tree, when generated and displayed, automatically reflects the changed data. For example, if a particular record is removed from the second relational table, then, when the child nodes of a particular third-level node are next generated and displayed, no node will be generated and displayed for the removed record. Similarly, if a particular record is added to the second relational table, then, when the child nodes of a particular third-level node are next generated and displayed, a node for the particular record will be generated and displayed, assuming that the node for the particular record actually qualifies as a child of the particular third-level node.

Beneficially, defining and creating a tree structure in the manner discussed above relieves the user from the requirement of manually adding each individual node to the tree separately. Instead of adding each node to the tree individually, a user can specify a whole class of nodes to place in the tree (e.g., at a particular level) by specifying the column(s) of a relational table whose value(s) should be used to classify the nodes to be added. Additionally, in one embodiment of the invention, the user can also add nodes to the tree in an individual manner at any level of a tree, including at levels that already contain dynamically generated nodes.

In one embodiment of the invention, nodes at multiple levels of a tree may be determined dynamically in the level described above. For example, the nodes at the second level of a tree may be dynamically generated based on values of a shoe model field in a first relational table, while the nodes at the third level of the same tree may be dynamically generated based on values of a shoe size field in a second relational table. This differs from approaches in which only leaf nodes of a tree (i.e., only nodes at the bottom level of the tree) may be dynamically generated.

Dynamic Range-Based Node Derivation

As is discussed above, in one embodiment of the invention, a user can define a manner in which nodes should be created at a particular tree level by specifying one or more fields of a relational table or other data source. When this is done, a separate node may be created automatically at the desired tree level for each unique set of values that occur in the specified field(s). Additionally or alternatively, in one embodiment of the invention, a user can manually specify, in addition to one or more field identifiers, one or more ranges of values for one or more nodes in a tree. When the user does so, child nodes of a particular node can be dynamically generated based on the ranges that are specified in that parent node of those child nodes.

For example, a user might specify that, in a particular level of a tree, the nodes should be dynamically generated based on the value of a shoe size field that is in each record of a particular relational table. However, instead of letting the application generate a separate node for each unique value that occurs in the shoe size field in the table, the user may specify a set of ranges for values for the shoe size field; each range in the set of ranges may have a different upper bound and lower bound. For example, the user might specify a set of ranges that includes (a) a first range that covers values 1-5 of the shoe size field, (b), a second range that covers values 6-10 of the shoe size field, and (c) a third range that covers values 11-15 of the shoe size field. As a result, three nodes would be generated at the particular level (one for each range in the user-specified set of ranges). In such an embodiment of the invention, when the user selects a particular node to cause the application to generate that particular node's children dynamically, the application will generate, as child nodes of the particular node, only nodes for records whose shoe size field values fall within the shoe size field range specified for the particular node. For example, in one embodiment of the invention, if the user double-clicks on a node for which a shoe size value range of 6-10 has been specified, then the application may query a specified relational table for all records whose shoe size field values fall into the 6-10 range. The application may dynamically generate and display a child node for each such record that also satisfies the criteria specified in all ancestors of the selected node.

According to one embodiment of the invention, a user can specify ranges at some levels of the tree and not at other levels of the tree. Under such circumstances, child nodes of a parent node may be generated based on the ranges specified in the parent node where such ranges are specified, and child nodes of a parent node may be generated based on unique values of one or more fields specified in the parent node where such ranges are not specified.

Node-Specific Data Sources

As is discussed above, in one embodiment of the invention, different levels of a tree can be generated dynamically based on different data sources. For example, nodes of one level of a tree might be generated dynamically based on values of fields that occur in a first relational table, while nodes of another level of that same tree might be generated dynamically based on values of fields that occur in a second relational table, while nodes of yet another level of that same tree might be generated dynamically based on values of fields that occur in a third relational table. The fields in the first, second, and third relational tables may differ, at least partially, from each other.

However, in an alternative embodiment of the invention, nodes within a particular level of a tree can be assigned to separate data sources. For example, at a particular level of a tree, a user might specify that a first node should be the parent of nodes that are generated from records in a first relational table, while a second node should be the parent of nodes that are generated from records in a second relational table. Thus, in one embodiment of the invention, different criteria for child node generation may be specified for different nodes, even within the same tree level. In such an embodiment of the invention, when a user requests to see the children of a node, the application queries the specified data source (e.g., relational table) and generates child nodes of the selected node based on the records that satisfy the query. Different child node generation criteria may be specified for each separate node of a tree, in one embodiment of the invention.

Example Dynamically Generated Tree

Figure 1:
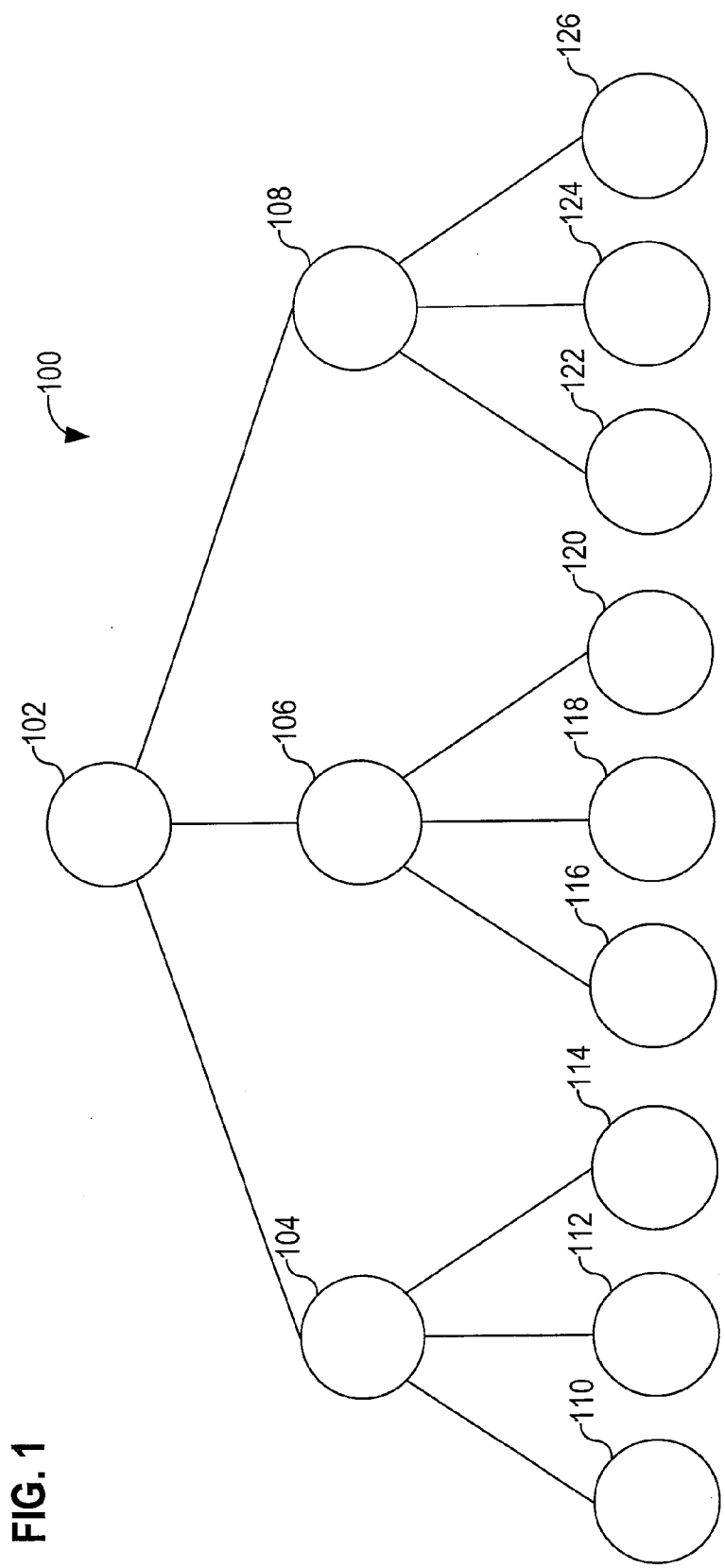
FIG. 1 illustrates an example of a tree in which at least some of the tree's nodes are dynamically generated based on different data sources, according to an embodiment of the invention.

FIG. 1 illustrates an example of a tree 100 in which at least some of the tree's nodes are dynamically generated based on different data sources, according to an embodiment of the invention. Three levels of nodes are shown in tree 100. Node 102, the root node, occurs at the first level of the tree. Nodes 104-108 occur at the second level of the tree. Nodes 110-126 occur at the third level of the tree. Nodes 104-108 are the children of node 102. Nodes 110-114 are the children of node 104. Nodes 116-120 are the children of node 106. Nodes 122-126 are the children of node 108.

In the example shown, the second-level nodes (nodes 104-108) are associated with a first relational table, while the third-level nodes (nodes 110-126) are associated with a second relational table. In the example shown, each of nodes 104-108 is dynamically generated based on values of a shoe model column in a first relational table; there is one node for each unique value that occurs in the shoe model column of the first relational table (although there may be multiple records that have each such unique value). Thus, in order to generate nodes 104-108, a user does not need to individually add each of nodes 104-108 to tree 100; instead, a user can simply specify that nodes at the second level are to be created based on unique values in the shoe model column of the first relational table, and the application will automatically derive nodes 104-108 from the records in the first relational table. In one embodiment of the invention, nodes 104-108 are generated simultaneously and are added to tree 100 simultaneously, rather than individually and at different times; because the criteria for generating all of nodes 104-108 are specified and available at one time, there is no reason to create nodes 104-108 at different times.

In the example shown, each of nodes 110-126 is dynamically generated based on ranges of values in a shoe size column of a second relational table; there is one node for each range that a user specifies (although there may be multiple records that have values that fall into each such range). For example, nodes 110, 116, and 122 may correspond to shoe size field values that fall into the 1-5 range, nodes 112, 118, and 124 may correspond to shoe size field values that fall into the 6-10 range, and nodes 114, 120, and 126 may correspond to shoe size field values that fall into the 11-15 range. Thus, for each range specified for the third level, a separate child node may be dynamically generated at the third level for each second-level node; each of second-level nodes 104-108 has a node for shoe size range 1-5, a node for shoe size range 6-10, and a node for shoe size range 11-15. The user does not need to create each third-level node separately; instead, the application may dynamically generate nodes 110-126 in response to the user's specification that the third-level nodes should be generated based on a specified set of column(s) of a specified relational table and the specified range(s). In one embodiment of the invention, nodes 110-126 are generated simultaneously and are added to tree 100 simultaneously, rather than individually and at different times; because the criteria for generating all of nodes 110-126 are specified and available at one time, there is no reason to create nodes 110-126 at different times.

In one embodiment of the invention, in order to cause the child nodes of any of nodes 110-126 to be generated dynamically, a user double-clicks on one of nodes 110-126 in a graphical user interface. When the user does so, the application responsively queries one or more relational table to determine a set of records that satisfy selection criteria that can be implied from the selected node and the selected node's ancestors. The application then generates and displays, in the graphical user interface, a separate node for each record that results from the query. For example, according to one embodiment of the invention, if a user double-clicked on node 110 in order to see the child nodes for node 110, then the application would determine that the criteria associated with node 110 include that all descendant nodes of node 110 must correspond to records whose shoe size field values fall within the 1-5 range. The application would further determine that the criteria associated with node 104 (relevant because node 104 is an ancestor of node 110) include that all descendant nodes of node 104 must correspond to records whose shoe model field values are "A." In this specific example, no criteria are associated with root node 102. Thus, in order to generate the child nodes of node 110 dynamically, the application would query the second relational table for all records that both (a) have shoe size field values that fall within the 1-5 range and (b) have shoe model values that equal "A." If the query returned seven records, then the database server would generate and display seven distinct child nodes of node 110 in the graphical user interface. In one embodiment of the invention, each such child node indicates values from the record to which that child node corresponds.

In one embodiment of the invention, a user can alternately cause the descendants of any node to be shown (when the descendants are current not displayed) or hidden (when the descendants are currently displayed) by double clicking on that node. In one embodiment of the invention, the descendants of a node are dynamically generated based on current data sources each time the display of the descendants of that node is requested.

Hardware Overview

Figure 2:
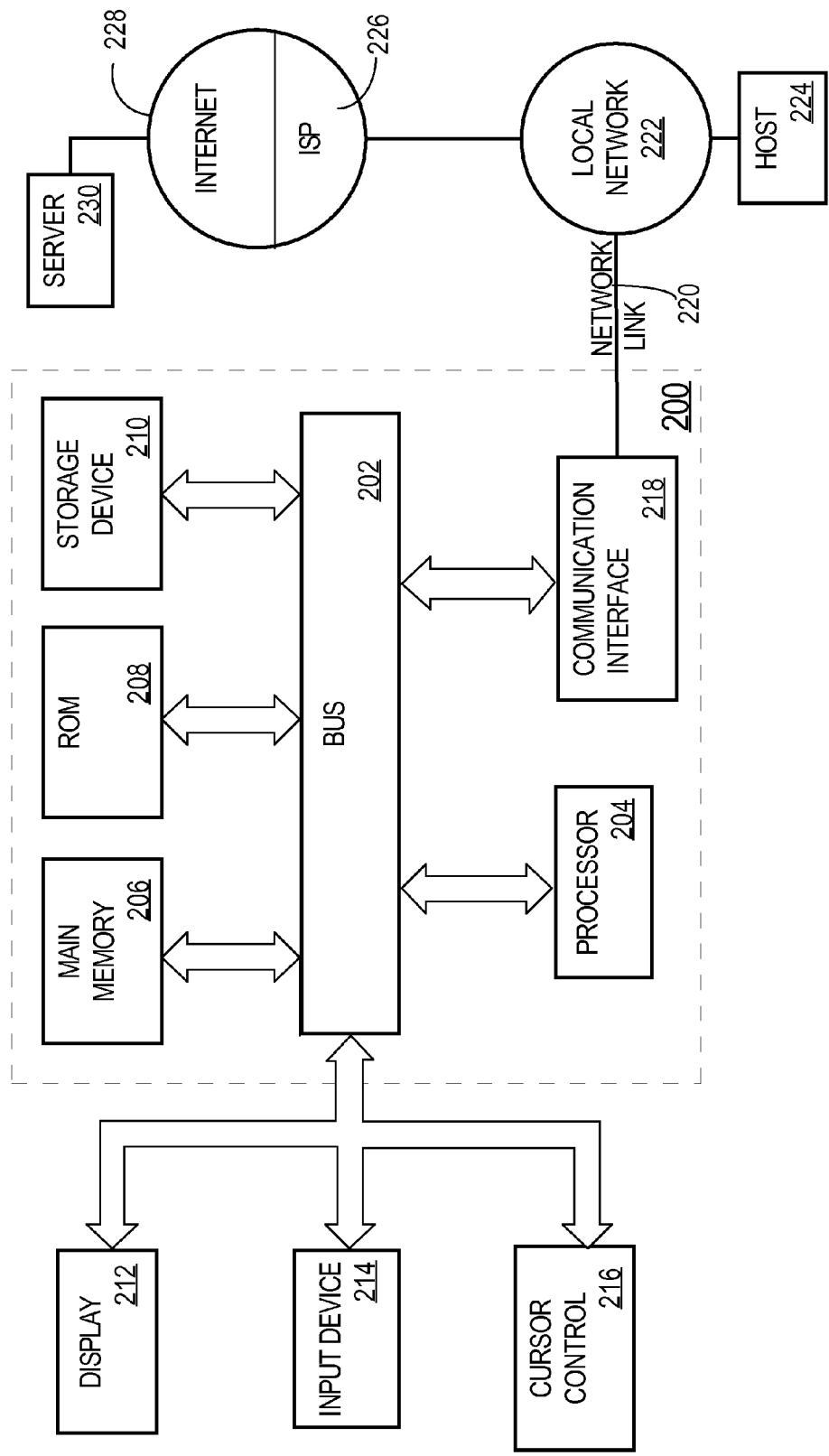
FIG. 2 is block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one implementation of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
receiving user-specified criteria comprising a first column of a first database table stored in a database, and a set of user-specified ranges comprising two or more user-specified ranges for values of the first column;
in response to receiving the user-specified criteria, adding, to a tree structure, a first new subtree comprising a first set of nodes, wherein each node in the first set of nodes corresponds to a particular user-specified range of the set of user-specified ranges for the first column;

displaying the tree structure with the first new subtree;
after displaying the tree structure with the first new subtree, receiving additional user input identifying a user-selected node of the first set of nodes that corresponds to a particular range of the set of user-specified ranges;
in response to receiving the additional user input identifying the user-selected node after displaying the tree structure with the first new subtree, identifying records in the database that match the particular range corresponding to the user-selected node, generating a second set of nodes based on a set of second field values for a second column of the identified records, and adding, to the tree structure, a second new subtree that descends from the user-selected node, the second new subtree comprising the second set of nodes;
after adding the second new subtree to the tree structure, displaying, in the tree structure, the second new subtree;
wherein the hierarchical parent-child relationship between the second set of nodes and the user-selected node of the first set of nodes is not generated or stored before the additional user input identifying the user-selected node is received;
wherein the steps are performed by one or more computing devices.

2. The method of claim 1, wherein adding, to the tree structure, the second new subtree comprising the second set of nodes comprises adding a separate node to the second set of nodes for each record that matches the particular range of the user-selected node.

3. The method of claim 1:
wherein the first set of nodes are at a first hierarchical level of the tree structure; and
wherein the second set of nodes are at a second hierarchical level of the tree structure.

4. The method of claim 3, further comprising:
determining nodes at a third level of the tree structure based at least in part on values that occur in a third field of a third database table.

5. The method of claim 1, further comprising:
adding two or more nodes to a first level of the tree structure;
associating a second user-selected node of the set of the first set of nodes with a different column than the second column associated with the user-selected node;
adding, to the tree structure, a third new subtree that descends from the second user-selected node such that the third new subtree is at a same hierarchical level as the second new subtree descending from the user-selected node;
displaying the tree structure with the third new subtree.

6. The method of claim 1, further comprising:
determining, at a first time, the second set of nodes of the second new subtree based at least in part on contents of the first database table and the second database table at the first time;
wherein the tree structure to which the second new subtree has been added is displayed at the first time;
determining, at a second time that occurs after the first time, and based at least in part on contents of the first database table and the second database table at the second time, an updated second new subtree comprising an updated second set of nodes; and
displaying the updated second new subtree at the second time;
wherein the second set of nodes determined at the first time differs from the updated second set of nodes determined at the second time.

7. The method of claim 1, further comprising:
adding two or more nodes simultaneously to a first level of the tree structure in response to receiving user input that specifies criteria for generating the two or more nodes; and
adding, to each node in the first level of the tree structure, simultaneously, two or more child nodes in response to receiving user input that specifies criteria for generating all of the child nodes.

8. The method of claim 1, wherein the second column is a column of a second database table stored in the database that is related to the first database table by a foreign key column.

9. A machine-readable non-transitory storage medium storing instructions which, when executed by one or more processors, cause the one or more processors to perform certain steps comprising:
receiving user-specified criteria comprising a first column of a first database table stored in a database, and a set of user-specified ranges comprising two or more user-specified ranges for values of the first column;
in response to receiving the user-specified criteria, adding to a tree structure, a first new subtree comprising a first set of nodes, wherein each node in the first set of nodes corresponds to a particular user-specified range of the set of user-specified ranges for the first column;
displaying the tree structure with the first new subtree;
after displaying the tree structure with the first new subtree, receiving additional user input identifying a user-selected node of the first set of nodes that corresponds to a particular range of the set of user-specified ranges;
in response to receiving the additional user input identifying the user-selected node after displaying the tree structure with the first new subtree, identifying records in the database that match the particular range corresponding to the user-selected node, generating a second set of nodes based on a set of second field values for a second column of the identified records, and adding, to the tree structure, a second new subtree that descends from the user-selected node, the second new subtree comprising the second set of nodes;
after adding the second new subtree to the tree structure, displaying, in the tree structure, the second new subtree;
wherein the hierarchical parent-child relationship between the second set of nodes and the user-selected node of the first set of nodes is not generated or stored before the additional user input identifying the user-selected node is received.

10. The machine-readable non-transitory storage medium of claim 9, wherein adding, to the tree structure, the second new subtree comprising the second set of nodes comprises adding a separate node to the second set of nodes for each record that matches the particular range of the user-selected node.

11. The machine-readable non-transitory storage medium of claim 9, wherein:
wherein the first set of nodes are at a first hierarchical level of the tree structure; and
wherein the second set of nodes are at a second hierarchical level of the tree structure.

12. The machine-readable non-transitory storage medium of claim 11, wherein the steps further comprise:
determining nodes at a third level of the tree structure based at least in part on values that occur in a third field of a third database table.

13. The machine-readable non-transitory storage medium of claim 9, wherein the steps further comprise:

adding two or more nodes to a first level of the tree structure;

associating a second user-selected node of the set of the first set of nodes with a different column than the second column associated with the user-selected node;

adding, to the tree structure, a third new subtree that descends from the second user-selected node such that the third new subtree is at a same hierarchical level as the second new subtree descending from the user-selected node;

displaying the tree structure with the third new subtree.

14. The machine-readable non-transitory storage medium of claim 9, wherein the steps further comprise:

determining, at a first time, the second set of nodes of the second new subtree based at least in part on contents of the first database table and the second database table at the first time;

wherein the tree structure to which the second new subtree has been added is displayed at the first time;

determining, at a second time that occurs after the first time, and based at least in part on contents of the first database table and the second database table at the second time, an updated second new subtree comprising an updated second set of nodes; and displaying the updated second new subtree at the second time;

wherein the second set of nodes determined at the first time differs from the updated second set of nodes determined at the second time.

15. The machine-readable non-transitory storage medium of claim 9, wherein the steps further comprise:

adding two or more nodes simultaneously to a first level of the tree structure in response to receiving user input that specifies criteria for generating the two or more nodes; and adding, to each node in the first level of the tree structure, simultaneously, two or more child nodes in response to receiving user input that specifies criteria for generating all of the child nodes.

16. The machine-readable non-transitory storage medium of claim 9, wherein the second column is a column of a second database table stored in the database that is related to the first database table by a foreign key column.

\* \* \* \* \*